United States Patent [19]

Gonseth et al.

[11] 4,237,184

[45] Dec. 2, 1980

[54] STRATIFIED PROTECTING COATING FOR WEARING PIECES AND HARD METAL CUTTING TOOLS

[75] Inventors: Denis R. Gonseth, Founex; Charles Hauser, Genolier, both of Switzerland

[73] Assignee: Stellram S.A., Nyon, Switzerland

[21] Appl. No.: 48,888

[22] Filed: Jun. 15, 1979

[30] Foreign Application Priority Data

Jun. 22, 1978 [CH] Switzerland .......................... 787/78

[51] Int. Cl.$^2$ .................. B32B 7/02; B32B 15/18
[52] U.S. Cl. ..................... 428/336; 148/6.3; 148/16.5; 148/16.6; 427/249; 427/419.7 F; 428/457; 428/469; 428/472; 428/539; 428/339
[58] Field of Search ............. 428/332, 333, 339, 457, 428/469, 472, 539, 336; 427/419 F, 399, 249, 379; 148/6, 6.3, 16.5, 16.6

[56] References Cited

U.S. PATENT DOCUMENTS

| | | | |
|---|---|---|---|
| 3,368,914 | 2/1968 | Darnell et al. | 427/419 F |
| 3,640,689 | 2/1972 | Glaski et al. | 427/419 F |
| 3,656,995 | 4/1972 | Reedy | 427/419 F |
| 3,959,557 | 5/1976 | Berry | 427/419 F |
| 3,964,937 | 6/1976 | Post et al. | 428/539 |
| 4,018,631 | 4/1977 | Hale | 427/419 F |

*Primary Examiner*—James J. Bell
*Attorney, Agent, or Firm*—Young & Thompson

[57] ABSTRACT

This invention relates to a hard metal wearing piece, especially for tools, which is covered at least on the places subjected to wear with stratified protecting coating. This stratified protecting coating comprises at least five superimposed layers, at least two of them being of different compositions; furthermore, the internal layer in contact with the substrate is a layer of carbide, the external layer is a layer of boride or carbide, and the intermediary layers are of carbide, nitride, oxide, boride, and/or of mixed compounds thereof.

13 Claims, No Drawings

STRATIFIED PROTECTING COATING FOR WEARING PIECES AND HARD METAL CUTTING TOOLS

Such protecting coating can be obtained preferably by the known method of chemical vapor deposition.

The present invention relates to a hard metal wearing piece, especially for tools, which is covered at least on the places subjected to wear with a stratified protecting coating.

The term "hard metal wearing piece" represents here pieces which are constituted of a mixture of high hardness metallic carbides, for example WC, TiC, TaC, NbC, etc., comprising a metal as binder or not, for example Fe, Co, Ni, etc. These pieces can be for example cutting bits or plates or tools for the machining of hard materials, for example steels.

It is already known especially from Swiss Pat. No. 592,161, U.S. Pat. No. 3,964,937 and DE-AS Pat. No. 1,959,690 in order to increase the resistance to wear of hard metal pieces, to cover their surface with a single, double or triple layer containing for example a carbide, a nitride, and/or a carbonitride of the 3rd to 6th groups of the periodic system. It is also known that the resistance to oxidation of the coating can be increased by the presence of a layer containing oxygen, for example an oxinitride layer as described in U.S. Pat. No. 4,018,631, or by covering the protecting coating with an external layer of a refractory oxide as recommended in Swiss Pat. Nos. 540,990 and 540,991.

Generally, the coatings now used, for example on cutting bits or plates, do not comprise more than three superimposed layers, and it is thus difficult to obtain the best resistance conditions for the bit or plate covered simultaneously to wear and to oxidation, while conferring to the machined piece a satisfactory surface state.

The purpose of the present invention is therefore to provide a stratified coating which improves the resistance to wear and to oxidation of hard metal pieces, for example cutting bits or plates, and which is more resistant to shocks, in comparison with the known coatings with two or three layers, while confering further or better surface state to the pieces machined by means of the bits or plates covered with such a stratified coating.

The object of the present invention consequently consists in providing a hard metal wearing piece, especially for tools, which is covered at least on the places subjected to wear with a stratified protecting coating, and which is characterized in that said stratified coating comprises at least five superimposed layers, at least two of them having different compositions, and by the fact that the layer which is in contact with the surface of the piece is a carbide layer, that the external layer is a boride or carbide layer, and that the intermediary layers are layers of carbide, nitride, oxide, boride or of mixed compounds thereof.

The wear of a cutting tool mainly depends on the three following factors: resistance to oxidation, friction coefficient and uniformity of the surface. Thanks to the present invention, these three factors are optimized, the carbide directly deposited onto the substrate allowing to obtain a uniform coating, the layers of boride, nitride and/or oxide increasing the friction coefficient and the resistance to oxidation of such a covered wearing piece.

It is also known that the carbide layer increases the flank wear, whereas nitride layer increases the crater wear. Furthermore, the oxide layer gives of course a better resistance to oxidation.

But what this invention further brings and which was not foreseeable for the man skilled in the art, is that the presence in the protecting coating of a higher number of layers than in the known coatings, for a similar total thickness, tends to clearly improve the properties of said coating.

As a matter of fact, by increasing the number of layers, the chip formed will be very quickly in contact with the layer which will better promote its outflow. Thus the "ideal" layer will be reached after a very slight wear, as well in crater as in flank, whereas with a conventional coating comprising only two or three layers, at least 30 to 50% of said coating should be weared before reaching the "ideal" layer.

Furthermore, the wearing depends also from the temperature of the tool during the work. Therefore, it is necessary that the energy which is disployed at the surface of the cutting bit or plate be minimal. Due to the presence of a stratified coating with multiple, repeating layers, the chip will form a wearing way through said coating, this way promoting that minimal energy since said chip will anyhow come up against a layer which will optimalize the various parameters.

It has also been observed that the presence of a stratified coating with multiple layers decreases the spreading of cracks through said coating and thus increases the resistance to shocks thereof and of the wearing piece.

Moreover, the presence of a boride layer at the surface of the protecting coating allows to obtain inexpectably a better state of the surface of the worked piece.

When one of the intermediary layers is a nitride layer, it is preferred, in order to improve the adherence to deposit, between the carbide layer and said nitride layer, one or more carbonitride layers, the composition of which could differ from a carbon rich carbonitride to a nitrogen rich carbonitride.

In the same manner, if there is two adjacent layers of boride and nitride, it will be necessary to form between them a succession of boronitride layers having various composition between $>0$ and $<100\%$ of each of both elements.

The total thickness of the coating on the wearing piece can vary between about 0.5 and $20\mu$, preferably between 1 and $10\mu$.

The number of layers constituting the protecting coating must be of at least five, and preferably of more than 10. The continuity effect increases with the importance of the stratification, without supressing the barrier effect against cracks spreading, said effect being not observed in the case of a continuous passage between two layers.

Furthermore, the repeat of layers or of a group of layers is propitious in most cases for the improvement of the desired properties of the protecting coating.

As carbides and nitrides, it is preferred to use those of Hf, Zr, Ta or Ti; as borides, it is preferred to use those of Hf, Zr, Ta, Ti or N; whereas as oxides, these of Al, Hf, Zr, Be and Ti are preferred.

For the formation of the protective coating on the surface of the cutting tool, any suitable method can be used allowing to obtain an adherent, compact, coherent and homogeneous coating.

The preferred method is the so-called chemical vapor deposition (CVD). As a matter of fact, the CVD method is advantageous in that it allows the easy formation of the coating by regulating the composition of the gas, the pressure and the temperature, and in that these various parameters can be easily determined by those skilled in the art, since the CVD technics of the carbides, nitrides, carbonitrides, oxinitrides, borides and oxides have already been described in the specialized literature.

The deposition is generally effected at a temperature between about 850° and 1200° C. The starting gaseous products can be for example a halogenide, hydrogen and a hydrocarbon, an oxigen compound or a nitrogenous compound for the deposition of carbides, nitrides or oxides respectively, whereas the boride deposition is obtained for example from two halogenides and hydrogen. If a layer with an intermediary composition or with a mixed compound is desired, then it is necessary to use an appropriate gaseous mixture of the corresponding compounds. The gaseous mixture may also contain an inert gas as carrier gas.

According to the sought results, the coating deposition can be carried out in one time, or in several steps, each step corresponding to the CVD deposition of one layer of the desired protecting coating. The CVD method is further advantageous in that the ratio of the components of the gaseous mixture can be modified during the deposition process, this leading consequently to the modification of the composition of the coating, either in a continuous or in a non continuous manner.

The present invention will be now illustrated by reference to the following examples.

EXAMPLE 1

A coating comprising three layers of respectively TiC, TiN and $TiB_2$ has been deposited by the known CVD technics on a hard metal cutting tool. The properties of resistance to wear of the so coated cutting tool have been then tested.

Simultaneously, the same properties have been tested for an identical tool, the protecting coating of which was constituted by the same compounds, but comprising eleven layers, the total thickness of both types of coatings being of about $8\mu$. The results obtained are the following, further compared with a non-coated tool:

(a) Turning of "CK 40" steel

| Working conditions: | velocity | 300 m/min |
| --- | --- | --- |
| | advance | 0.41 mm per turn |
| | depth of cut | 3.2 mm |
| | substrate | "P 25" |
| | tool | "SPUN 120308" geometry |

| | Cutting time | Wearing of the tool (mm) | |
| --- | --- | --- | --- |
| Coating | (sec) | flank wear | wear on nose |
| TiC-TiN-$TiB_2$ (3 layers) | 100 | 0.25 | 0.25 |
| TiC-4TiCN-Tin-4TiBN-$TiB_2$ (11 layers)* | 100 | 0.18 | 0.18 |
| non coated tool | 7 | tool destroyed | |

*N.B. The successive layers of TiCN (here 4), respectively of TiBN, present increasing contents in N and decreasing contents in C, respectively increasing contents in B and decreasing contents in N.

(b) "CK 40" steel disk test

| Working conditions: | min. velocity | 230 m/min |
| --- | --- | --- |
| | max. velocity | 824 m/min |
| | depth of cut | 1.5 mm |
| | substrate | "P 25" |
| | tool | "TCMM 22 04 08" geometry |
| | $\phi$ min. | 70 mm |
| | $\phi$ max. | 250 mm |

| | Diameter on disk for which wear has been measured on nose of the tool (mm) | | |
| --- | --- | --- | --- |
| Coating | 0.1 mm | 0.2 mm | 0.5 mm |
| TiC-TiN-$TiB_2$ (3 layers) | 197 | 200 | 205 |
| TiC-4TiCN-TiN-4TiBn-$TiB_2$ (11 layers)* | 200 | 206 | 215 |
| non coated tool | 120 | 130 | 135 |

*N.B. (See above N.B.)

EXAMPLE 2

Comparison by turning of "CK 60" steel of the properties of resistance to wear of two coatings, each having a total thickness of about $10\mu$, but a very different number of layers.

| Working conditions: | velocity | 200 m/min |
| --- | --- | --- |
| | advance | 0.41 mm per turn |
| | depth of cut | 3.2 mm |
| | substrate | "P 25" |
| | tool | "TNMM 22 04 08" geometry |

| | Cutting time | Wearing of the tool (mm) | |
| --- | --- | --- | --- |
| Coating | (sec) | flank wear | wear on nose |
| TiC-TiN (2 layers)* | 180 | tool destroyed | |
| TiC-3TiCN-TiN-$Al_2O_3$-TiC (7 layers) | 480 | tool destroyed | |

*N.B. (See N.B. of Example 1)

EXAMPLE 3

Comparison by "CK 40" steel disk test of the properties of resistance to wear of two coatings, each having a total thickness of about 8 to $10\mu$ but a very different number of layers.

| Working conditions: | advance | 0.30 mm per turn |
| --- | --- | --- |
| | depth of cut | 1.5 mm |
| | min. velocity | 230 m/min |
| | max. velocity | 824 m/min |
| | substrate | "P 25" |
| | tool | "TCMM 22 04 08" geometry |
| | $\phi$ minimum | 70 mm |
| | $\phi$ maximum | 250 mm |

| | Diameter on disk for which wear has been measured on nose of the tool (mm) | | |
| --- | --- | --- | --- |
| Coating | 0.1 mm | 0.2 mm | 0.5 mm |
| TiC-$Al_2O_3$ (2 layers) | 221.5 | 228 | 230 |
| TiC-2TiCN*-TiN-2TiCN*-TiC-$Al_2O_3$-$TiB_2$ (9 layers) | 228 | 238 | 240 |

*N.B. (see N.B. of Example 1)

The results obtained for the above examples 1 to 3 cleary show, on one hand, that the wearing pieces according to the present invention covered with a coating with multiple and repeating layers have much better properties of resistance to wear than the non coated tools, and on the other hand, that the multiple stratification of the protecting coating brings a non foreseeable improvement with regards to the cutting behaviour of the tool compared with a coating of a similar thickness comprising the same compounds but presenting only two or three superimposed and non repeating layers.

EXAMPLE 4

Roughness measurements have been carried out on the surface of the "CK 40" steel pieces which have been worked by means of cutting bits covered with a protecting coating according to the present invention, but the external surface of which being constituted by a layer of respectively TiN, Al$_2$O$_3$ and TiB$_2$.

| Working conditions: | velocity | 200 m/min |
|---|---|---|
| | advance | 0.4 mm per turn |
| | depth of cut | 3.2 mm |
| | tool | "TNMM 22 04 08" geometry |

The roughness measurements have been carried out in a direction parallel to the tooling grooves; the results obtained are the following:

| External surface | Ra* | |
|---|---|---|
| TiN | 1.27 μ | (50 μin) |
| Al$_2$O$_3$ | 1.14 μ | (45 μin) |
| TiB$_2$ | 0.75 μ | (70 μin) |

(*arithmetical average of undulations)

It results from these measurements that an external layer of TiB$_2$ allows to obtain a much better surface state of the tooled piece, giving to it especially a more brilliant aspect.

What is claimed is:

1. A hard metal wearing piece, especially for tools, which is covered at least on the places subjected to wear with a stratified protecting coating comprising at least five superimposed layers, at least two of them having different compositions, the layer which is in contact with the surface of the piece consisting in a carbide layer, the external layer consisting in a boride or a carbide layer, and the intermediary layers being layers of carbide, nitride, oxide, boride or of mixed compounds thereof.

2. A wearing piece according to claim 1, in which said coating comprises at least ten superimposed layers.

3. A wearing piece according to claim 1, in which said coating comprises an alternating succession of at least two layers of different compositions.

4. A wearing piece according to claim 1, in which said coating comprises several times the same group of layers of different compositions.

5. A wearing piece according to claim 1, in which said external layer is a boride layer.

6. A wearing piece according to claim 1, in which the total thickness of said coating is comprised between about 1 and 20μ.

7. A wearing piece according to claim 1, in which said carbide and nitride layers are consisting of Hf, Zr, Ti or Ta carbides and nitrides.

8. A wearing piece according to claim 1, in which said boride layers are consisting of Hf, Zr, Ti, Ta or N borides.

9. A wearing piece according to claim 1, in which said oxide layers are consisting of Hf, Zr, Ti, Be or Al oxides.

10. A wearing piece according to claim 1, in which said coating is consisting in the succession of TiC, TiCN, TiN, TiBN and TiB$_2$.

11. A wearing piece according to claim 1, in which said coating is consisting in the succession of TiC, TiCN, TiN, Al$_2$O$_3$ and TiC.

12. A wearing piece according to claim 1, in which said coating is consisting in the succession of TiC, TiCN, TiN, TiCN, TiC, Al$_2$O$_3$ and TiB$_2$.

13. A wearing piece according to claim 1, in which said coating comprises several successive layers of carbonitrides, respectively of boronitrides, said successive layers differing from each other by the C and N contents, respectively by the B and N contents.

* * * * *